(12) United States Patent
Yen

(10) Patent No.: US 12,413,054 B2
(45) Date of Patent: Sep. 9, 2025

(54) STRIPPING TOOL

(71) Applicant: KAUW YEHI INDUSTRIAL CO., LTD., New Taipei (TW)

(72) Inventor: Yu-Ting Yen, New Taipei (TW)

(73) Assignee: KAUW YEHI INDUSTRIAL CO., LTD., New Taipei (TW)

( * ) Notice: Subject to any disclaimer, the term of this patent is extended or adjusted under 35 U.S.C. 154(b) by 357 days.

(21) Appl. No.: 18/104,296

(22) Filed: Feb. 1, 2023

(65) Prior Publication Data

US 2024/0258774 A1    Aug. 1, 2024

(51) Int. Cl.
*H02G 1/12* (2006.01)
(52) U.S. Cl.
CPC ................................ *H02G 1/1212* (2013.01)
(58) Field of Classification Search
CPC .... B25B 5/02; B25B 5/04; B25B 5/06; B25B 7/00; B25B 7/02; B25B 7/04; B25B 7/12; B25B 7/22; H02G 1/12; H02G 1/1212; H02G 1/1236
See application file for complete search history.

(56) References Cited

U.S. PATENT DOCUMENTS

| | | | | |
|---|---|---|---|---|
| 7,360,472 B2* | 4/2008 | Krampe | ............... | H02G 1/1212 81/9.43 |
| 11,811,201 B2* | 11/2023 | Holland-Moritz | ... | H02G 1/1212 |
| 2009/0126534 A1* | 5/2009 | Storm | .................. | H02G 1/1212 81/9.43 |

FOREIGN PATENT DOCUMENTS

| | | | |
|---|---|---|---|
| AU | 2018374402 A1 | | 5/2020 |
| DE | 2402187 | * | 7/1975 |
| DE | 2402187 A1 | | 7/1975 |

OTHER PUBLICATIONS

Search Report dated Jul. 19, 2023 of the corresponding European patent application No. 23154516.1.

* cited by examiner

*Primary Examiner* — Robert J Scruggs
(74) *Attorney, Agent, or Firm* — Chun-Ming Shih; HDLS IPR SERVICES

(57) ABSTRACT

A stripping tool includes a fixed handle (10), a fixed clamp plate (20), a movable handle (30), a movable clamp plate (40), a cutting/pulling mechanism (50) and a driving operation mechanism (60). The driving operation mechanism (60) includes a pushing assembly (61), a pressing assembly (62) and an action member (63). One end of the pushing assembly (61) is connected to the moveable handle (30) and another end is moveably connected to the action member (63). The pressing assembly (62) is fixed to the fixed handle (10). One end of the action member (63) is connected to the cutting/pulling mechanism (50) and another end is elastically pressed by the pressing assembly (62). When the movable handle (30) rotates toward the fixed handle (10), the pushing assembly (61) moves the action member (63) and the cutting/pulling mechanism (50) toward the pressing assembly (62) to implement wire stripping.

9 Claims, 7 Drawing Sheets

STRIPPING TOOL

BACKGROUND

Technical Field

The disclosure relates to a technology of a hand tool, particularly to a stripping tool.

Related Art

General plumber and electrician works such as maintenance and piping usually require to strip outer insulated layers of various cables or wires to expose the cores in the cables or wires, so as to be ready for subsequent electric connection. Thus, there are wire strippers in the market for removing outer insulated layers of cables or wires without damaging inner cores to smooth the stripping process.

A wire stripper includes a first handle, a second handle, a first pressing member, a second pressing member and s stripping assembly. The first handle, the second handle, the first pressing member and the second pressing member are pivoted together. The stripping assembly is installed between the first pressing member and the second pressing member, and acts with the first handle and the second handle. Therefore, the first pressing member, the second pressing member and the stripping assembly may be driven to perform wire stripping by pressing the first handle and the second handle.

However, such a wire stripper has the following problems. Related elements are disposed in a limited space, so its moment arm cannot be effectively increased and causes considerable laboriousness in the using process. Also, because too many components are to be assembled, the manufacturing of the wire strippers is complicated, the structure is unstable and the cost is high.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a stripping tool, which may achieve the function of labor-saving operation and stable operation.

To accomplish the above object, the disclosure provides a stripping tool, which includes a fixed handle, a fixed clamp plate, a movable handle, a movable clamp plate, a cutting/pulling mechanism, and a driving operation mechanism. The fixed clamp plate is connected to the fixed handle. The movable handle is connected pivotally to the fixed handle and formed under the fixed clamp plate. The movable clamp plate is connected pivotally to the fixed handle and correspondingly formed above the fixed clamp plate. The cutting/pulling mechanism is disposed between the fixed clamp plate and the movable clamp plate. The driving operation mechanism includes a pushing assembly, a pressing assembly, and an action member. One end of the pushing assembly is connected to the moveable handle and another end of the pushing assembly is moveably connected to the action member. The pressing assembly is fixed to the fixed handle. One end of the action member is connected to the cutting/pulling mechanism and another end of the action member is elastically pressed by the pressing assembly. When the movable handle is triggered to rotate toward the fixed handle, the pushing assembly moves the action member and the cutting/pulling mechanism toward the pressing assembly to implement wire stripping.

The disclosure further has the following function. By the strip-shaped sliding trough, the cutting/pulling mechanism may not shift when each cutting knife is used to cut a wire or cable.

DETAILED DESCRIPTION

Figure 1:
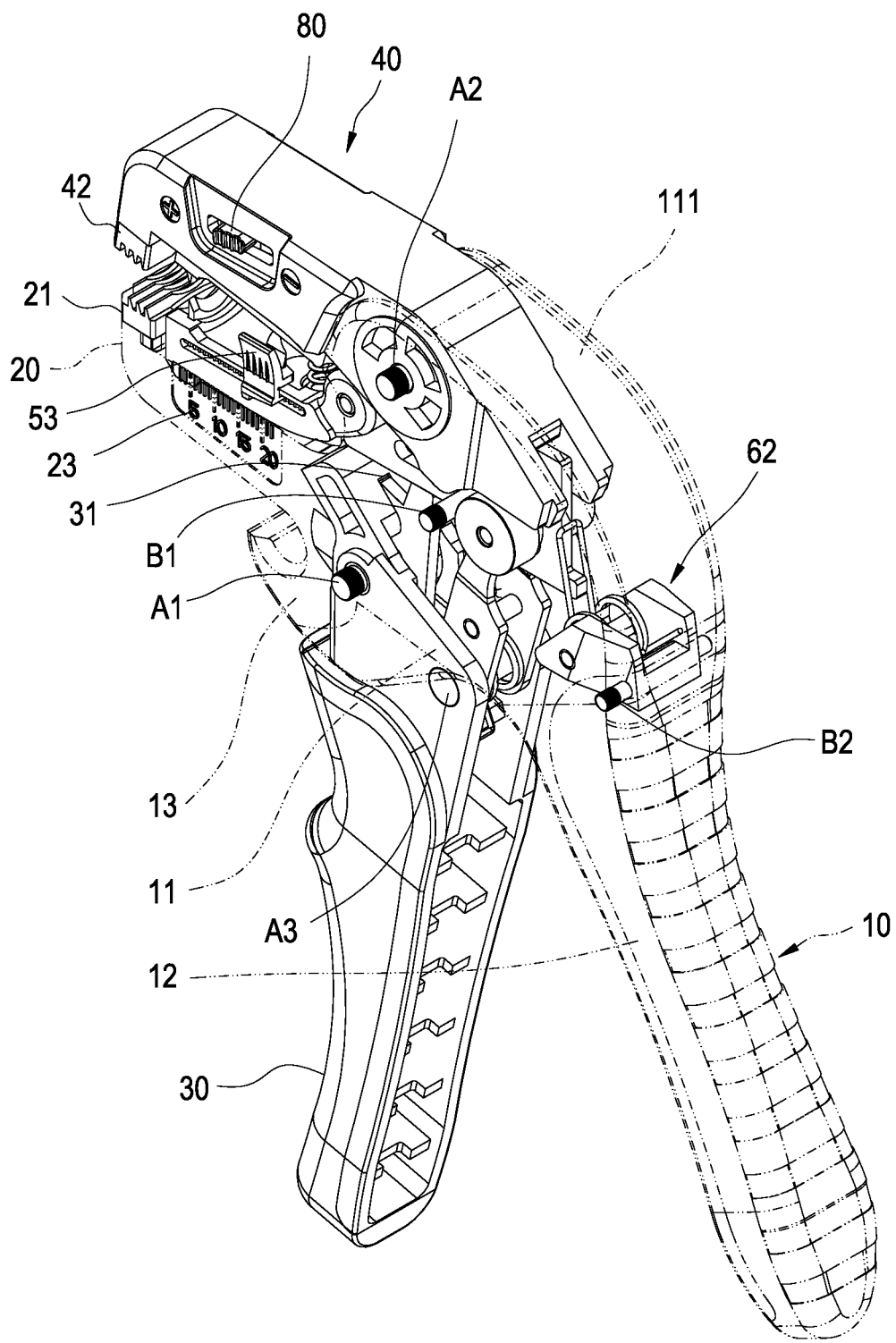
FIG. 1 is an assembled perspective view of the stripping tool of the disclosure.
Figure 2:
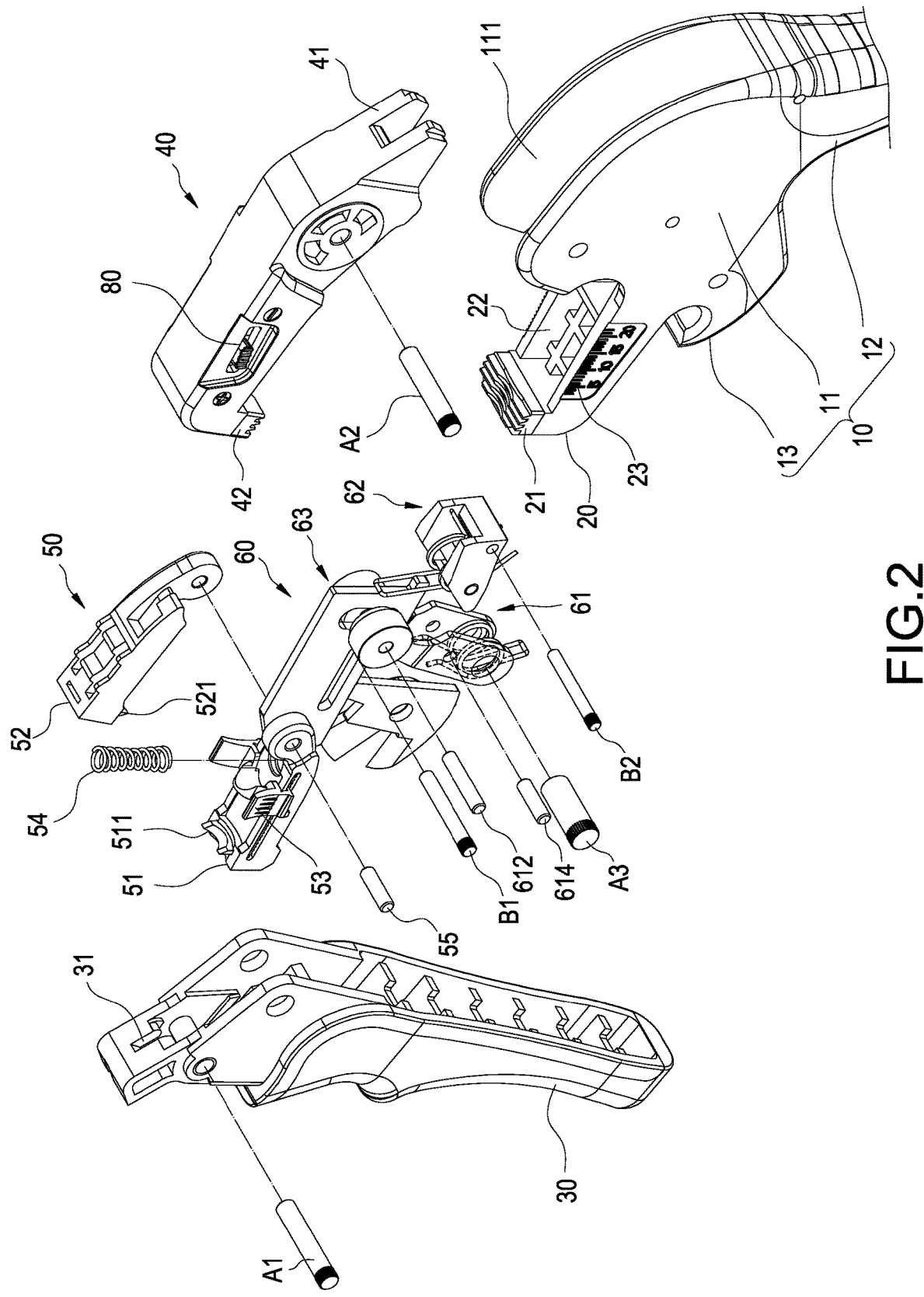
FIG. 2 is an exploded view of the stripping tool of the disclosure.
Figure 3:
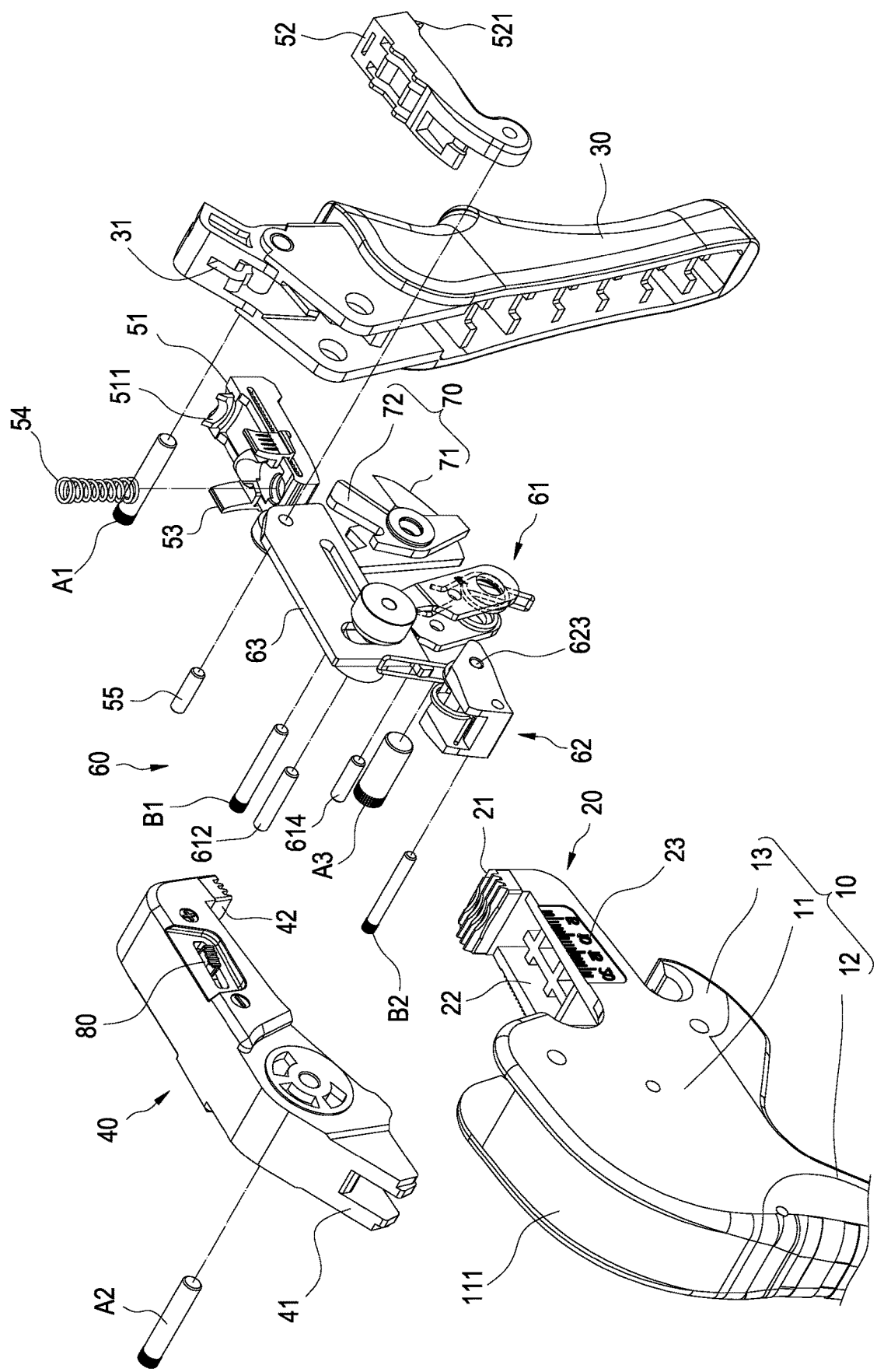
FIG. 3 is an exploded view of the stripping tool of the disclosure from another viewpoint.
Figure 4:
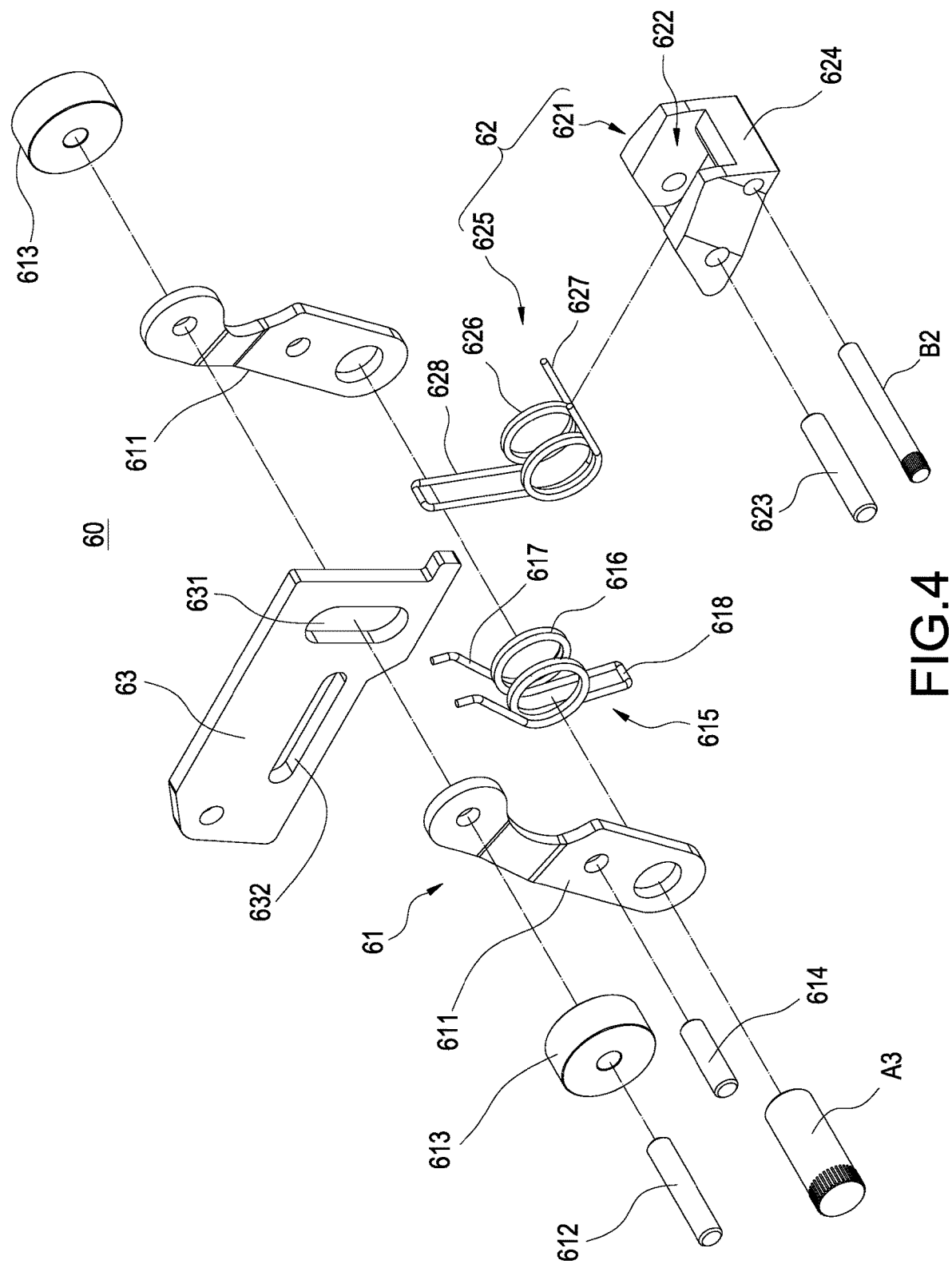
FIG. 4 is an exploded view of the driving operation mechanism tool of the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIGS. 1-5. The disclosure provides a stripping tool, which is a wire stripper in the embodiment and includes a fixed handle 10, a fixed clamp plate 20, a movable handle 30, a movable clamp plate 40, a cutting/pulling mechanism 50 and a driving operation mechanism 60.

The fixed clamp plate 20 is extended from the fixed handle 10. The movable handle 30 is connected pivotally to the fixed handle 10 and formed under the fixed clamp plate 20. The movable clamp plate 40 is connected pivotally to the fixed handle 10 and correspondingly formed above the fixed clamp plate 20. The cutting/pulling mechanism 50 is disposed between the fixed clamp plate 20 and the movable clamp plate 40. The driving operation mechanism 60 includes a pushing assembly 61, a pressing assembly 62 and an action member 63. One end of the pushing assembly 61 is connected to the moveable handle 30 and another end of the pushing assembly 61 is moveably connected to the action member 63. The pressing assembly 62 is fixed to the fixed handle 10. One end of the action member 63 is connected to the cutting/pulling mechanism 50 and another end of the action member 63 is elastically pressed by the pressing assembly 62.

In an embodiment, the fixed handle 10 includes a head portion 11, a stem portion 12 downward aslant extended from the head portion 11, and a throat portion 13 downward and aslant extended from the head portion 11 and deflecting from the stem portion 12. The movable handle 30 is penetrated through by a first shaft A1 to implement the pivotal connection between the movable handle 30 and the throat portion 13 of the fixed handle 10.

In an embodiment, the movable clamp plate 40 and the fixed handle 10 are penetrated through by a second shaft A2 to implement the pivotal connection therebetween. The right side of the movable clamp plate 40 is extended with a driven arm 41. A side of the head portion 11 of the fixed handle 10 is disposed with a blocking plate 111 used for limiting the rotational stroke of the driven arm 41. A front end of the fixed clamp plate 20 is installed with lower clamping teeth 21, and a front end of the movable clamp plate 40 is connected with upper clamping teeth 42. The upper clamping teeth 42 are arranged corresponding to the lower clamping teeth 21 to jointly clamp a wire or cable. Also, the inside of the lower clamping teeth 21 is disposed with a lower trough 22 and a scale 23.

In an embodiment, the movable handle 30 and one end of the pushing assembly 61 are penetrated through by a third shaft A3 so as to make the movable handle 30 be able to drive the action member 63 and the cutting/pulling mechanism 50 to move together.

In an embodiment, the cutting/pulling mechanism 50 is disposed between the fixed clamp plate 20 and the movable clamp plate 40, and includes a lower pressing member 51, an upper pressing member 52, a stopping member 53, an elastic body 54 and a bolt 55. The upper pressing member 52, the lower pressing member 51 and the action member 63 are penetrated through by the bolt 55. The stopping member 53 is movably disposed on the lower pressing member 51 and arranged corresponding to the scale 23. The elastic body 54 is elastically clamped between the lower pressing member 51 and the upper pressing member 52. The front end of the lower pressing member 51 is disposed with a lower cutting knife 511, and the front end of the upper pressing member 52 is disposed with an upper cutting knife 521 arranged corresponding to the lower cutting knife 511.

Figure 5:
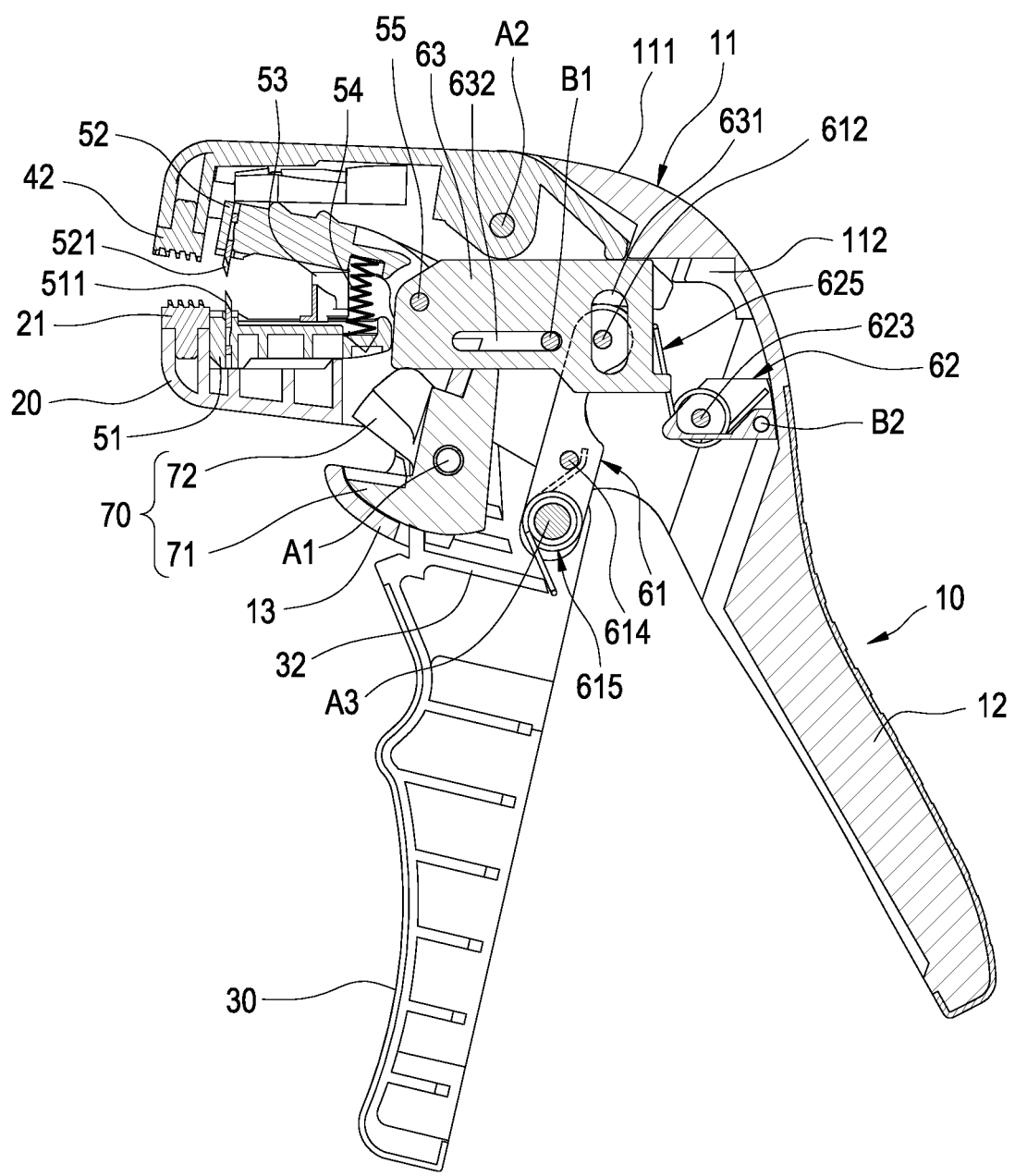
FIG. 5 is an assembled cross-sectional view of the stripping tool of the disclosure.

In an embodiment, a guiding trough 112 is formed in the head portion 11 of the fixed handle 10 (as shown in FIG. 5) to allow the action member 63 to move in or move out. The action member 63 is disposed with a strip-shaped sliding trough 631 and an oriented trough 632. The strip-shaped sliding trough 631 is arranged longitudinally and the oriented trough 632 is arranged transversely. A first fixing plug B1 penetrates through the oriented trough 632 and is fixed to the fixed handle 10 so as to limit the action member 63 to reciprocate transversely. Please refer to FIG. 4. In an embodiment, the pushing assembly 61 includes two pushing rods 611 and an elastic body 615. The strip-shaped sliding trough 631 of the action member 63 and each pushing rod 611 are penetrated through by a spindle 612 so as to implement the movable connection of each pushing rod 611 and the action member 63. A part of the spindle 612 outside each pushing rod 611 is connected with a roller 613 to perform the functions of stopping, vibration absorption and noise reduction by the contact between the roller 613 and the first fixing plug B1 when the movable handle 30 returns. Also, an inserting rod 614 penetrates through each pushing rod 611 to provide positioning of an end of the elastic body 615. Furthermore, the inside of the movable handle 30 has a pressing plate 32 as shown in FIG. 5. The elastic body 615 includes a ring 616 and a first arms 617 and a second arm 618 extended from the ring 616. The third shaft A3 penetrates through the movable handle 30, each pushing rod 611 and the ring 616 of the elastic body 615. Each first arm 617 elastically abuts against the inserting rod 614, and the second arm 618 elastically abuts against the pressing plate 32 of the movable handle 30, thereby allowing the movable handle 30 to return to the original position. The first arm 617 may be designed as a single piece.

In an embodiment, the pressing assembly 62 is installed correspondingly at a joint between the head portion 11 and the stem portion 12 of the fixed handle 10, and is positioned by a second fixing plug B2 penetrating therethrough. The pressing assembly 62 includes a base 621 and an elastic element 625. The base 621 is formed with a receiving trough 622. The base 621 is disposed with a bolt 623. The rear of the receiving trough 622 is formed with a block 624. The elastic element 625 includes a ring 626 and a first elastic arms 627 and a second elastic arm 628 extended from the ring 626. The ring 626 is received in the receiving trough 622, and is positioned by the insert 623 penetrating through the base 621 and the ring 626. An end of each first elastic arm 627 abuts against the blocking block 624. An end of the second elastic arm 628 abuts against the action member 63 to allow the action member 63 to return. The first elastic arm 627 may be designed as a single piece.

In an embodiment, the stripping tool of the disclosure further includes a dividing knife 70. The top of the movable handle 30 is provided with an embedding trough 31. The dividing knife 70 includes a fixed knife 71 installed on the throat portion 13 of the fixed handle 10 and a movable knife 72 installed on the embedding trough 31 of the movable handle 30 corresponding to the fixed knife 71. The movable knife 72 may cut a wire or cable with respect to the fixed knife 71 with the inserting of the first shaft A1 when rotating the movable handle 30.

In an embodiment, the stripping tool of the disclosure further includes a cutting depth adjustment mechanism 80 disposed between the movable clamp plate 40 and the cutting/pulling mechanism 50. The opening width between the lower pressing member 51 and the upper pressing member 52 may be limited by the adjustment and shift of the cutting depth adjustment mechanism 80, so as to be able to match different specifications of various wires or cables to be adaptively adjusted.

Figure 6:
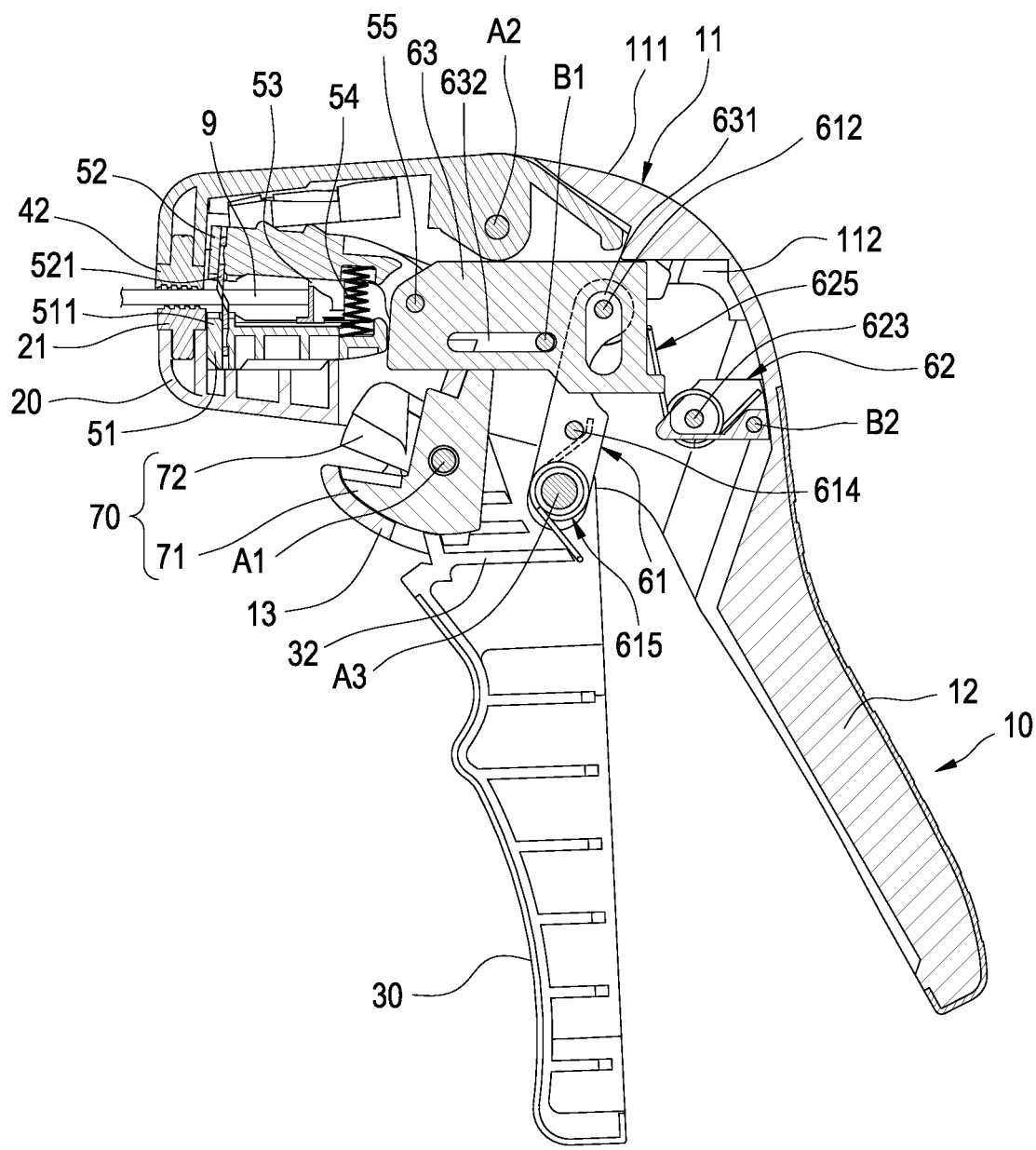
FIG. 6 is a cross-sectional view of the stripping tool of the disclosure which is performing cutting.
Figure 7:
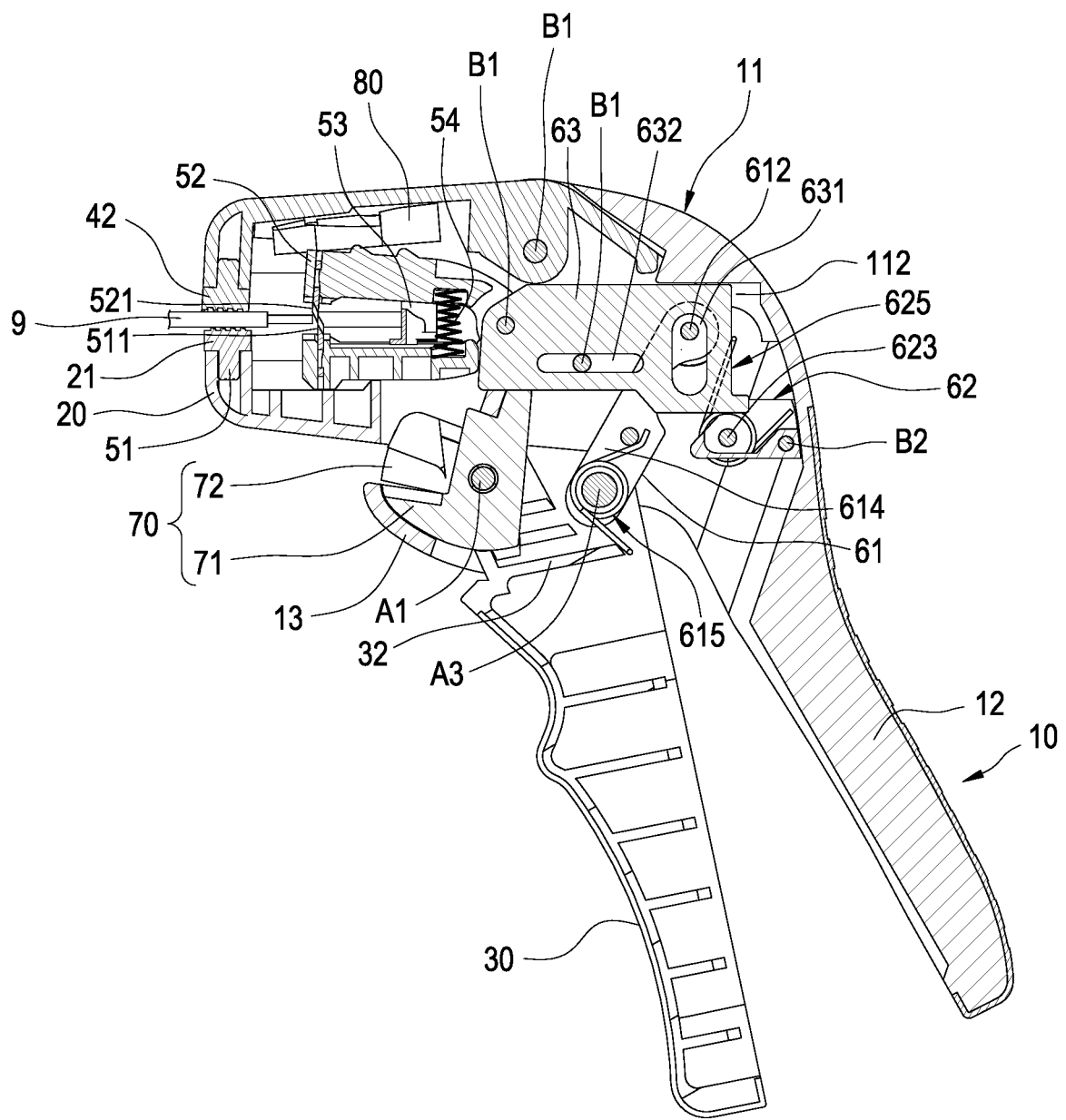
FIG. 7 is a cross-sectional view of the stripping tool of the disclosure which is performing pulling.

Please refer to FIGS. 6 and 7. When operating, a cable or wire 9 is placed between the upper clamping teeth 42 and lower clamping teeth 21, and an end face of the cable or wire 9 abuts against the stopping member 53. When the movable handle 30 is triggered to rotate toward the fixed handle 10, the movable clamp plate 40 may move the upper pressing member 52 toward the lower pressing member 51 to close. By clamping the cable or wire 9 with the upper clamping teeth 42 and the lower clamping teeth 21, and cutting the covering layer of the cable or wire 9 with the upper cutting knife 521 and the lower cutting knife 511, the spindle 612 of each pushing rod 611 shifts toward the top of the strip-shaped sliding trough 631 and the first fixing plug B1 is located at the right end of the oriented trough 632 of the action member 63, so as to prevent the cutting/pulling mechanism 50 from shifting during cutting the cable or wire 9 as shown in FIG. 6.

When continuously rotating the movable handle 30 toward the fixed handle 10, if its action force is greater than the elastic force of the elastic element 625 of the pressing assembly 62, each pushing rod 611 may drive the action member 63 and the cutting/pulling mechanism 50 to move toward the pressing assembly 62, and the upper cutting knife 521 and the lower cutting knife 511 may pull out the covering layer of the cable or wire 9 as shown in FIG. 7. The above structure may delay the time of the covering layer of the cable or wire 9 being pulled out, after the cutting/pulling mechanism 50 cut that, to make the whole action process more stable and smoother.

While this disclosure has been described by means of specific embodiments, numerous modifications and variations could be made thereto by those skilled in the art without departing from the scope and spirit of this disclosure set forth in the claims.

What is claimed is:

1. A stripping tool comprising:
   a fixed handle (10);
   a fixed clamp plate (20), connected to the fixed handle (10);
   a movable handle (30), connected pivotally to the fixed handle (10), and disposed under the fixed clamp plate (20);
   a movable clamp plate (40), connected pivotally to the fixed handle (10), and correspondingly disposed above the fixed clamp plate (20);
   a cutting/pulling mechanism (50), disposed between the fixed clamp plate (20) and the movable clamp plate (40);
   a driving operation mechanism (60), comprising a pushing assembly (61), a pressing assembly (62) and an action member (63), wherein one end of the pushing assembly (61) is connected to the moveable handle (30) and another end of the pushing assembly (61) is moveably connected to the action member (63), the pressing assembly (62) is fixed to the fixed handle (10), and one end of the action member (63) is connected to the cutting/pulling mechanism (50) and another end of the action member (63) is elastically pressed by the pressing assembly (62); and
   a first fixing plug (B2), wherein the pressing assembly (62) comprises a base (621) and an elastic element (625), the base (621) is fixed to the fixed handle (10) by the first fixing plug (B2), the base (621) comprises a bolt (623) and a receiving trough (622), the receiving trough (622) is defined by a blocking block (624), the elastic element (625) comprises a ring (626) and a first elastic arm (627) and a second elastic arm (628) extended from the ring (626), the ring (626) is received in the receiving trough (622), the elastic element (625) is positioned by the bolt (623) passing through the base (621) and the ring (626), the first elastic arm (627) abuts against the blocking block (624), and the second elastic arm (628) abuts against the action member (63);
   wherein when the movable handle (30) is triggered to rotate toward the fixed handle (10), the pushing assembly (61) moves the action member (63) and the cutting/pulling mechanism (50) toward the pressing assembly (62) to implement wire stripping.

2. The stripping tool of claim 1, further comprising a first shaft (A1), wherein the fixed handle (10) comprises a head portion (11), a stem portion (12) downward extended from the head portion (11) and a throat portion (13) extended from the head portion (11) and deflecting from the stem portion (12), and the movable handle (30) is connected pivotally with the throat portion (13) through the first shaft (A1).

3. The stripping tool of claim 2, further comprising a dividing knife (70), wherein the movable handle (30) comprises an embedding trough (31), the dividing knife (70) comprises a fixed knife (71) installed on the throat portion (13) and a movable knife (72) installed on the embedding trough (31) corresponding to the fixed knife (71), and the first shaft (A1) passes through the fixed knife (71) and the movable knife (72).

4. The stripping tool of claim 1, further comprising a second shaft (A2), wherein the movable clamp plate (40) is connected pivotally to the fixed handle (10) through the second shaft (A2), the movable clamp plate (40) comprises a driven arm (41) extended therefrom, and the fixed handle (10) comprises a blocking plate (111) to limit a rotational stroke of the driven arm (41).

5. The stripping tool of claim 1, further comprising a third shaft (A3), wherein the movable handle (30) is configured to drive the action member (63) and the cutting/pulling mechanism (50) to move through one end of the pushing assembly (61) being passed through by the third shaft (A3).

6. The stripping tool of claim 1, further comprising a second fixing plug (B1), wherein the action member (63) comprises an oriented trough (632), and the second fixing plug (B1) passes through the oriented trough (632) and is fixed to the fixed handle (10) to limit a moving direction of the action member (63).

7. The stripping tool of claim 1, wherein the pushing assembly (61) comprises two pushing rods (611) and a spindle (612), the action member (63) comprises a strip-shaped sliding trough (631), and each pushing rod (611) is movably connected to the action member (63) by the spindle (612) passing through the strip-shaped sliding trough (631) and each pushing rod (611).

8. A stripping tool comprising:
   a fixed handle (10);
   a fixed clamp plate (20), connected to the fixed handle (10);
   a movable handle (30), connected pivotally to the fixed handle (10), and disposed under the fixed clamp plate (20);
   a movable clamp plate (40), connected pivotally to the fixed handle (10), and correspondingly disposed above the fixed clamp plate (20);
   a cutting/pulling mechanism (50), disposed between the fixed clamp plate (20) and the movable clamp plate (40);
   a driving operation mechanism (60), comprising a pushing assembly (61), a pressing assembly (62) and an action member (63), wherein one end of the pushing assembly (61) is connected to the moveable handle (30) and another end of the pushing assembly (61) is moveably connected to the action member (63), the pressing assembly (62) is fixed to the fixed handle (10), and one end of the action member (63) is connected to the cutting/pulling mechanism (50) and another end of the action member (63) is elastically pressed by the pressing assembly (62); and
   wherein when the movable handle (30) is triggered to rotate toward the fixed handle (10), the pushing assembly (61) moves the action member (63) and the cutting/pulling mechanism (50) toward the pressing assembly (62) to implement wire stripping;
   wherein the pushing assembly (61) comprises two pushing rods (611) and a spindle (612), the action member (63) comprises a strip-shaped sliding trough (631), and each pushing rod (611) is movably connected to the action member (63) by the spindle (612) passing through the strip-shaped sliding trough (631) and each pushing rod (611);
   wherein the pushing assembly (61) further comprises two rollers (613), and each roller (613) is adapted to sheathed the spindle (612) and located outside each pushing rod (611).

9. A stripping tool comprising:
   a fixed handle (10);
   a fixed clamp plate (20), connected to the fixed handle (10);
   a movable handle (30), connected pivotally to the fixed handle (10), and disposed under the fixed clamp plate (20);

a movable clamp plate (40), connected pivotally to the fixed handle (10), and correspondingly disposed above the fixed clamp plate (20);

a cutting/pulling mechanism (50), disposed between the fixed clamp plate (20) and the movable clamp plate (40);

a driving operation mechanism (60), comprising a pushing assembly (61), a pressing assembly (62) and an action member (63), wherein one end of the pushing assembly (61) is connected to the moveable handle (30) and another end of the pushing assembly (61) is moveably connected to the action member (63), the pressing assembly (62) is fixed to the fixed handle (10), and one end of the action member (63) is connected to the cutting/pulling mechanism (50) and another end of the action member (63) is elastically pressed by the pressing assembly (62); and a third shaft (A3), wherein the pushing assembly (61) further comprises an inserting rod (614) and an elastic body (615), the movable handle (30) comprises a pressing plate (32), the inserting rod (614) passes through each pushing rod (611), the elastic body (615) comprises a ring (616) and a first arm (617) and a second arm (618) extended from the ring (616), the third shaft (A3) passes through the movable handle (30), each pushing rod (611) and the ring (616), the first arm (617) elastically abuts against the inserting rod (614), and the second arm (618) elastically abuts against the pressing plate (32);

wherein when the movable handle (30) is triggered to rotate toward the fixed handle (10), the pushing assembly (61) moves the action member (63) and the cutting/pulling mechanism (50) toward the pressing assembly (62) to implement wire stripping;

wherein the pushing assembly (61) comprises two pushing rods (611) and a spindle (612), the action member (63) comprises a strip-shaped sliding trough (631), and each pushing rod (611) is movably connected to the action member (63) by the spindle (612) passing through the strip-shaped sliding trough (631) and each pushing rod (611).

* * * * *